US010021215B2

(12) United States Patent
Ma et al.

(10) Patent No.: US 10,021,215 B2
(45) Date of Patent: Jul. 10, 2018

(54) METHOD AND SERVER FOR ALLOCATING GAME RESOURCES

(71) Applicant: Tencent Technology (Shenzhen) Company Limited, Shenzhen, Guangdong (CN)

(72) Inventors: Liang Ma, Shenzhen (CN); Jing Zhou, Shenzhen (CN); Zhiqiang He, Shenzhen (CN); Xuan Yu, Shenzhen (CN); Qi Li, Shenzhen (CN); Tao Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 596 days.

(21) Appl. No.: 14/463,589

(22) Filed: Aug. 19, 2014

(65) Prior Publication Data

US 2014/0359005 A1 Dec. 4, 2014

Related U.S. Application Data

(63) Continuation of application No. PCT/CN2013/071133, filed on Jan. 30, 2013.

(30) Foreign Application Priority Data

Feb. 23, 2012 (CN) .......................... 2012 1 0042385

(51) Int. Cl.
*H04L 29/06* (2006.01)
*H04L 29/08* (2006.01)
(Continued)

(52) U.S. Cl.
CPC .............. *H04L 67/42* (2013.01); *A63F 13/35* (2014.09); *H04L 47/50* (2013.01); *H04L 47/781* (2013.01);
(Continued)

(58) Field of Classification Search
CPC ......... H04L 51/32; H04L 41/06; H04L 51/10; G06F 15/16; G06F 17/30864; G06F 3/0487
(Continued)

(56) References Cited

U.S. PATENT DOCUMENTS 6,203,433 B1 3/2001 Kume
8,734,243 B2 * 5/2014 Harrington ............ G06Q 50/01
463/29
(Continued)

FOREIGN PATENT DOCUMENTS

CN 1862547 11/2006
CN 101068194 11/2007
(Continued)

OTHER PUBLICATIONS

Extended European Search Report for European Patent Application No. 13751466.7, dated Feb. 17, 2015.
(Continued)

*Primary Examiner* — Tesfay Yohannes
(74) *Attorney, Agent, or Firm* — Anova Law Group, PLLC

(57) ABSTRACT

The present invention discloses a method and a server for allocating game resources, which belongs to the field of network technology. The method includes: receiving a game participation request including game subzone information sent by a user; when the user enters a game subzone identified by the game subzone information, assigning the user to a waiting queue corresponding to the user in the game subzone in accordance with a predetermined condition; and when the user is successfully assigned to the waiting queue, selecting participants to play in the same group with the user from waiting queues other than the waiting queue of the user, and allocating game resources for
(Continued)

the user and the selected participants. The present technical solution can effectively reduce occurrence of the game participants' cheating.

16 Claims, 6 Drawing Sheets

(51) Int. Cl.
*A63F 13/35* (2014.01)
*H04L 12/863* (2013.01)
*H04L 12/911* (2013.01)

(52) U.S. Cl.
CPC ............ *H04L 67/10* (2013.01); *H04L 67/141* (2013.01); *H04L 67/306* (2013.01); *H04L 67/38* (2013.01)

(58) Field of Classification Search
USPC ................ 709/203, 205, 206; 463/42; 340/5
See application file for complete search history.

(56) References Cited

U.S. PATENT DOCUMENTS

| | | | |
|---|---|---|---|
| 2006/0019745 A1* | 1/2006 | Benbrahim | G06Q 20/341 463/29 |
| 2007/0126186 A1 | 6/2007 | Crawford, III et al. | |
| 2007/0184904 A1* | 8/2007 | Lee | A63F 13/10 463/42 |
| 2007/0226307 A1* | 9/2007 | Bae | G07F 17/3223 709/206 |
| 2008/0026827 A1 | 1/2008 | Skotarczak et al. | |
| 2008/0045335 A1 | 2/2008 | Garbow et al. | |
| 2008/0224822 A1* | 9/2008 | Gelman | G07C 9/00103 340/5.2 |
| 2008/0303811 A1 | 12/2008 | Van Luchene | |
| 2010/0016081 A1* | 1/2010 | Prochnow | G07F 17/32 463/42 |
| 2010/0035694 A1 | 2/2010 | Losica | |
| 2010/0093443 A1 | 4/2010 | Yan et al. | |
| 2011/0105093 A1* | 5/2011 | Chang | H04L 12/1822 455/414.1 |
| 2011/0161423 A1* | 6/2011 | Pratt | G06Q 10/06 709/205 |
| 2011/0173183 A1* | 7/2011 | Dasdan | G06F 17/30864 707/719 |
| 2013/0079103 A1* | 3/2013 | Nicely | G07F 17/3223 463/20 |
| 2013/0083003 A1* | 4/2013 | Perez | G06F 3/005 345/419 |
| 2013/0130791 A1* | 5/2013 | Myogan | A63F 13/60 463/30 |

FOREIGN PATENT DOCUMENTS

| | | |
|---|---|---|
| CN | 102223373 | 10/2011 |
| EP | 2360631 | 8/2011 |
| JP | 2004113743 | 4/2004 |
| JP | 2009233268 | 10/2009 |
| KR | 10-2001-0096091 | 11/2001 |
| KR | 10-2007-0084720 | 8/2007 |
| KR | 10-2008-0085102 | 9/2008 |
| WO | WO-2005/045610 | 5/2005 |
| WO | WO-2007/078372 | 7/2007 |

OTHER PUBLICATIONS

International Preliminary Report on Patentability for International Application No. PCT/CN2013/071133, dated Aug. 26, 2014.
Non-Final Office Action for Korean Patent Application No. 10-2014-7026077, dated Jan. 27, 2015.
Chinese Office Action, dated Apr. 27, 2016, Chinese Application No. 201210042385.9.
Non-Final Office Action for Japanese Patent Application No. 2014-557982, dated Oct. 26, 2015.
International Search Report for International Application No. PCT/CN2013/071133, dated May 9, 2013, 2 pages.
Non-Final Office Action for Korean Patent Application No. 10-2014-7026077, dated Jul. 21, 2015.

* cited by examiner

METHOD AND SERVER FOR ALLOCATING GAME RESOURCES

CROSS-REFERENCE TO RELATED APPLICATIONS

The present application is a continuation of International Application No. PCT/CN2013/071133 filed on Jan. 30, 2013, which claims priority of a Chinese Application that was filed to State Intellectual Property Office of P. R. C. on Feb. 23, 2012 with Application No. 201210042385.9, and all contents thereof are incorporated therein in its entirety by reference.

TECHNICAL FIELD

The present invention relates to a field of network technology, and in particular to a method and a server for allocating game resources.

BACKGROUND

With rapid development of network technology, the online game gradually takes a great proportion in people's recreational life, and greatly enriches people's leisure and entertainment life. However, in game operations, the cheating behaviors of a minority of players will be encountered in the online game, especially in the online games with high interactivity where game players accumulate points by playing among game players, or in those where the game players pick up the bonus by completing playing tasks. For example, complains of the game player's cheating are often received in the present online games such as a game of Fight Landlord Happily.

In the prior technical solutions, the following two ways typically are employed to prevent the cheating behaviors of the game players:

In prior art one, a strategy of preventing cheating is embedded in a client, in which the embedded strategy can somewhat prevent the game players from cheating. However, if the strategy of preventing the game players from cheating embedded in the client is decoded by a user, it will need to upgrade the strategy for preventing cheating in the client, making a back-end server of the strategy for preventing cheating uncontrollable, and moreover, once the strategy of preventing cheating is malicious encoded, the cost for upgrading the client is also relatively high.

In prior art two, information communications are forbidden among the game players, such as forbidding the game player to see any information of the opposite side, or shielding any chat messages between the game players, etc. However, forbidding the information communication among the game players will make user experiences poor, thereby reducing market competitiveness of game products.

SUMMARY OF THE INVENTION

A method for allocating game resources is provided, the method including:

receiving a game participation request sent by a user, the game participation request including game subzone information;

when the user enters a game subzone identified by the game subzone information, assigning the user to a waiting queue that the user corresponds to in the game subzone in accordance with a predetermined condition; and when the user is successfully assigned to the waiting queue, selecting participant(s) to play in the same group with the user from waiting queue(s) other than the waiting queue of the user, and allocating game resources for the user and the selected participant(s).

A server is provided, the server including a receiving module, a queue assignment module and a participant assignment module; wherein the receiving module is adapted to receive a game participation request sent by the user, the game participation request including the game subzone information;

the queue assignment module is adapted to, when the user enters a game subzone identified by the game subzone information, assign the user to the waiting queue that the user corresponds to in the game subzone in accordance with a predetermined condition; and the participant assignment module is adapted to, when the user is successfully assigned to the waiting queue, select participant(s) to play in the same group with the user from waiting queue(s) other than the waiting queue of the user, and allocate game resources for the user and the selected participant(s).

A machine-readable medium is provided, the machine-readable medium having a set of instructions stored thereon, where when the set of instructions is executed, a machine is enabled to perform a method for allocating game resources, the method including:

receiving a game participation request sent by a user, the game participation request including game subzone information;

when the user enters a game subzone identified by the game subzone information, assigning the user to a waiting queue that the user corresponds to in the game subzone in accordance with a predetermined condition; and when the user is successfully assigned to the waiting queue, selecting participant(s) to play in the same group with the user from waiting queue(s) other than the waiting queue of the user, and allocating game resources for the user and the selected participant(s).

BRIEF DESCRIPTION OF ACCOMPANYING DRAWINGS

In order to more clearly illustrate the technical solution in the embodiments of the present invention, the drawings that need to use in the description of the embodiments will be briefly described hereinafter. Apparently, the drawings in the following description are merely some of the embodiments of the present invention, and for the person skilled in the art, other drawings can be obtained based on these drawings without making inventive labors.

DETAILED DESCRIPTIONS OF EMBODIMENTS OF THE INVENTION

In order to make the objects, the technical solution and the advantages of the present invention more apparent, a further detailed description of the embodiments of the present invention will be discussed with reference to the accompanying drawings.

Embodiment I

Figure 1:
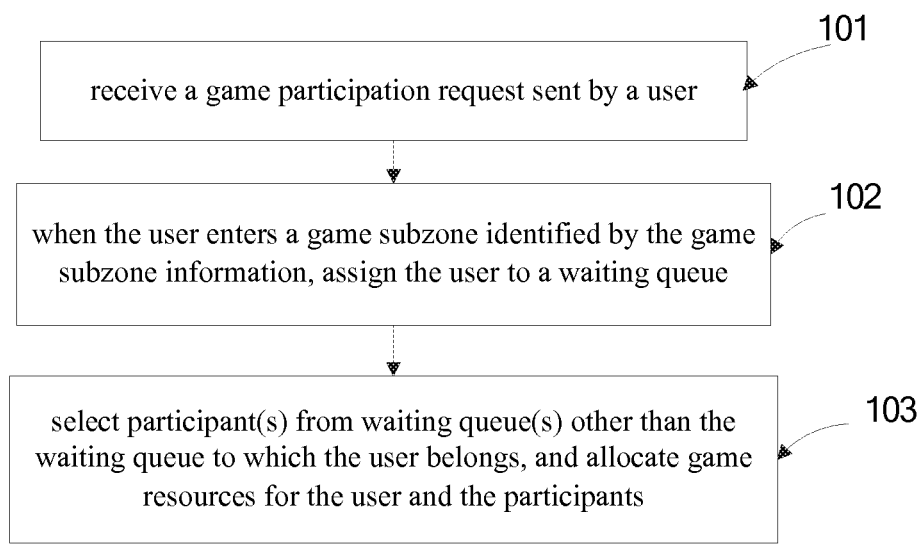
FIG. 1 is a flow diagram of a method for allocating game resources provided in Embodiment I of the present invention.

Referring to FIG. 1, a method for allocating game resources, which specifically may be performed by a cloud server, includes the following steps:

Step 101: receive a game participation request sent by a user, wherein, the game participation request includes game subzone information.

Step 102: when the user enters a game subzone identified by the game subzone information, assign the user to a waiting queue that the user corresponds to in the game subzone in accordance with a predetermined condition.

Step 103: when the user is successfully assigned to the waiting queue that the user corresponds to, select participant(s) to play in the same group with the user from waiting queue(s) other than the waiting queue to which the user belongs, and allocate game resources for the user and the participants selected to play in the same group with the user.

By the implementation of the technical solution of assigning the user to the corresponding waiting queue in accordance with the predetermined condition in the game subzone, and when the user is successfully assigned to the waiting queue that the user corresponds to, selecting the participant(s) to play in the same group with the user from the waiting queue(s) other than the waiting queue to which the user belongs in accordance with a specific algorithm, and allocating game resources for the user and the participants to play in the same group with the user, all users who participate in the game can come from different waiting queues, to some extent eliminating the possibility that the game participants know each other, thereby can effectively prevent the situation of the game participants' cheating.

Embodiment 2

Figure 2:
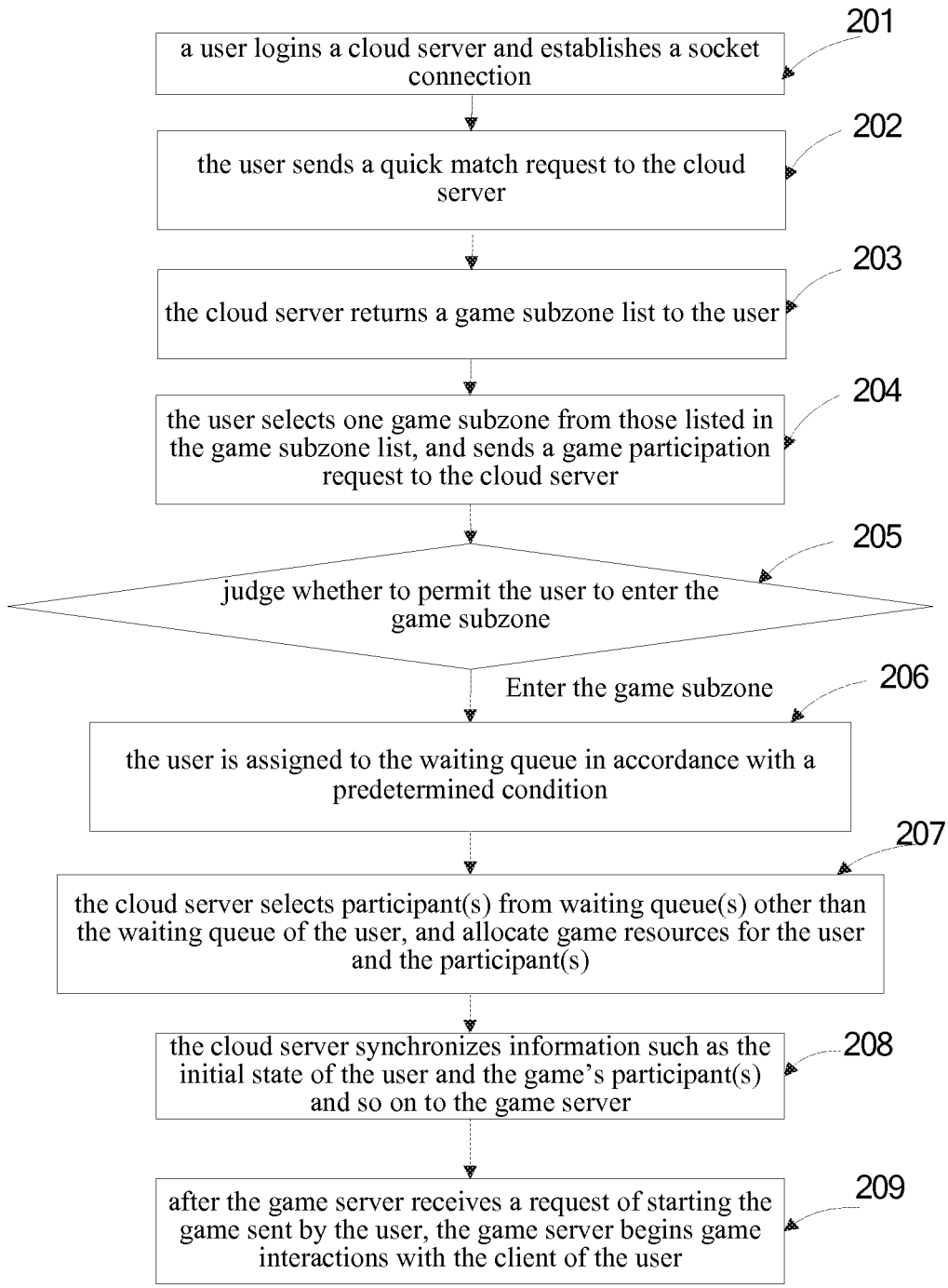
FIG. 2 is a flow diagram of a method for allocating game resources provided in Embodiment II of the present invention.

Referring to FIG. 2, a method for allocating resources specifically may be performed by a cloud server, the cloud server may integrate in a game server for implementation, and alternatively, may be implemented as independent from the game server, and when the cloud server is implemented as independent from the game server, the cloud server is connected with a client and the game server respectively over the network. The method includes the following steps:

Step 201: a user logins a cloud server, and establishes a socket connection with the cloud server.

In particular, the user starts a game application installed on the client, and inputs an account number and password to perform the operation of logging in the cloud server.

After receiving the account number and the password, the cloud server matches the account number with the password, and after a successful match is got, the cloud server returns to the user information such as a login Key value obtained upon a successful login, and the login Key value uniquely identities the identity of the user in a game.

Step 202: after the user establishes the socket connection with the cloud server, the user sends a quick match request to the cloud server.

Step 203: after the cloud server receives the quick match request sent by the user, the cloud server returns a game subzone list to the user.

Step 204: the user selects one game subzone from those listed in the game subzone list returned by the cloud server, and sends a game participation request to the cloud server, the game participation request containing the information of game subzone selected by the user, where the information of the game subzone may specifically be an ID, or a serial number or the like of a game subgroup, which is used for uniquely identifying the game subzone.

Step 205: the cloud server receives the game participation request sent by the user, judges whether to permit the user who sends the game participation request to enter the game subzone identified by the game subzone information.

When the user enters the game subzone identified by the game subzone information, Step 206 is performed.

When the user cannot enter the game subzone identified by the game subzone information, a message of failing to enter the game subzone is returned to the user, and after the user receives the message of failing to enter the game subzone, the user may reselect a game subzone according to the game subzone list returned by the cloud server, or end his operation.

In particular, the step of the cloud server receiving a game participation request sent by the user and judging whether to permit the user who sends the game participation request to enter the game subzone identified by the game subzone information includes:

checking whether the game subzone identified by the game subzone information has remaining space;

permitting the user to enter the game subzone identified by the game subzone information on the condition that the game subzone identified by the game subzone information has remaining space; and prohibiting the user from entering the game subzone identified by the game subzone information on the condition that there is no remaining space in the game subzone identified by the game subzone information.

Step 206: in the game subzone identified by the game subzone information, the user is assigned to the waiting queue that the user corresponds to in accordance with a predetermined condition.

Herein, the user may be assigned to the waiting queue that the user corresponds to in accordance with the predetermined condition by the following four methods:

In the first method, the predetermined condition is the time when the user enters the game subzone, so that the step of assigning the user to the waiting queue that the user corresponds to in accordance with the predetermined condition includes:

Determine a time segment to which the user correspondingly belongs according to the time when the user enters the game subzone.

Obtain the waiting queue that the time segment to which the user correspondingly belongs corresponds to according to a correspondence between pre-stored time segments and waiting queues.

In the embodiment of the present invention, the cloud server has already pre-constructed a plurality of waiting queues, separated a period of time (such as one day) into a plurality of successive time segments each of which corresponds to one waiting queue, and established and cached the correspondence between the time segments and the waiting queues. Thus, the cloud server can obtain the waiting queue that the time segment to which the user correspondingly belongs corresponds to by looking up the correspondence between the pre-stored time segments and the waiting queues.

Judge whether the obtained waiting queue has remaining space.

On the condition that the obtained waiting queue has remaining space, assign the user to the obtained waiting queue.

On the condition that there is no remaining space in the obtained waiting queue, return a message of failing to enter the game subzone to the user, so that after the user receives the message of failing to enter the game subzone, the user can reselect a game subzone according to the game subzone list returned by the cloud server, or end his operation.

In the second method, the predetermined condition is an Internet Protocol (IP) address being used when the user enters the game subzone, so that the step of assigning the user to the waiting queue that the user corresponds to in accordance with the predetermined condition includes:

Determine an IP address segment to which the user correspondingly belongs according to the IP address being used when the user enters the game subzone.

Obtain the waiting queue that the IP address segment to which the user correspondingly belongs corresponds to according to a correspondence between pre-stored IP address segments and waiting queues.

In the embodiment of the present invention, the cloud server has already pre-constructed a plurality of waiting queues, separated the IP address into a plurality of successive IP address segments each of which corresponds to a waiting queue, and established and cached the correspondence between the IP address segments and the waiting queues. Thus the cloud server can query the correspondence between the pre-stored IP address segments and the waiting queues according to the IP address segment to which the user correspondingly belongs, and judge whether the waiting queue that the IP address segment to which the user belongs corresponds to can be obtained by looking up the correspondence between the pre-stored IP address segments and the waiting queues. In the embodiment of the present invention, when the waiting queue that the user corresponds to cannot be obtained by looking up the correspondence between the pre-stored IP address segments and the waiting queues, preferably, the user is assigned to a reserved waiting queue, where the IP addresses of users in the reserved waiting queue may not be continuous, so as to reduce the failure rate of the user entering the waiting queue and increase the success rate of the user participating in the game. Accordingly, a message of failing to enter the game subzone can be returned to the user, so that after the user receives the message of failing to enter the game subzone, the user can reselect a game subzone according to the game subzone list returned by the cloud server, or end his operation.

Judge whether the obtained waiting queue has remaining space.

On the condition that the obtained waiting queue has remaining space, assign the user to the obtained waiting queue.

On the condition that there is no remaining space in the obtained waiting queue, return a message of failing to enter the game subzone to the user, so that after the user receives the message of failing to enter the game subzone, the user can reselect a game subzone according to the game subzone list returned by the cloud server, or end his operation.

In the third method, the predetermined condition is an Internet Protocol (IP) address being used when the user enters the game subzone, so that the step of assigning the user to the waiting queue that the user corresponds to in accordance with the predetermined condition includes:

Obtain a frequency of entering the game subzone that the Internet Protocol (IP) address being used when entering the game subzone corresponds to according to a correspondence between pre-stored IP addresses and frequencies of entering the game subzone.

Obtain the waiting queue that the obtained frequency of entering the game subzone corresponds to according to a correspondence between pre-stored frequency segments and waiting queues.

In the embodiment of the present invention, the cloud server can look up the correspondence between the pre-stored frequency segments and the waiting queues based on the obtained frequency of entering the game subzone, and determine whether the waiting queue that the obtained frequency of entering the game subzone corresponds to can be obtained by looking up the correspondence between the pre-stored frequency segments and the waiting queues, and when the waiting queue that the user corresponds to cannot be obtained by looking up the correspondence, preferably, the cloud server assigns the user to a reserved waiting queue, where the reserved waiting queue does not correspond to any of the frequencies of entering the game subzone, so as to reduce the failure rate of the user entering the waiting queue and increase the success rate of the user participating in the game. Accordingly, the cloud server may return a message of failing to enter the game subzone to the user, so that after the user receives the message of failing to enter the game subzone, the user can reselect a game subzone according to the game subzone list returned by the cloud server, or end his operation.

Judge whether the obtained waiting queue has remaining space.

On the condition that the obtained waiting queue has remaining space, assign the user to the obtained waiting queue.

On the condition that there is no remaining space in the obtained waiting queue, return a message of failing to enter the game subzone to the user, so that after the user receives the message of failing to enter the game subzone, the user can reselect a game subzone according to the game subzone list returned by the cloud server, or end his operation.

In the fourth method, the predetermined condition is a combination of the time when the user enters the game subzone and an Internet Protocol (IP) address being used when the user enters the game subzone, so that the step of assigning the user to the waiting queue that the user corresponds to in accordance with the predetermined condition includes:

Determine a time segment to which the user correspondingly belongs according to the time when the user enters the game subzone, and determine an IP address segment to which the user correspondingly belongs according to the IP address being used when the user enters the game subzone.

Obtain the waiting queue that the determined time segment and IP address segment corresponds to according to a correspondence between pre-stored time IP segments and waiting queues.

In the embodiment of the present invention, the cloud server can look up the correspondence between the pre-stored time IP segments and the waiting queues based on the determined time segment and the IP address segment, and judge whether the waiting queue that the determined time segment and the IP address segment correspond to can be obtained from the correspondence between the pre-stored time IP segments and the waiting queues, and when the waiting queue cannot be obtained by looking up the correspondence, preferably, the user can be assigned to a reserved waiting queue, where the reserved waiting queue does not correspond to any combination of the time segments and IP address segments, so as to reduce the failure rate of the user entering the waiting queue and increase the success rate of the users participating the game. Accordingly, the cloud server may return a message of failing to enter the game subzone to the user, so that after the user receives the message of failing to enter the game subzone, the user can reselect a game subzone according to the game subzone list returned by the cloud server, or end his operation.

Judge whether the obtained waiting queue has remaining space.

On the condition that the obtained waiting queue has remaining space, assign the user to the obtained waiting queue.

On the condition that there is no remaining space in the obtained waiting queue, return a message of failing to enter the game subzone to the user, so that after the user receives the message of failing to enter the game subzone, the user can reselect a game subzone according to the game subzone list returned by the cloud server, or end his operation.

Step 207: when the user is successfully assigned to the waiting queue that the user corresponds to, the cloud server selects participant(s) to play in the same group with the user from waiting queue(s) other than the waiting queue of the user in accordance with a specific algorithm, and allocate game resources for the user and the participant(s) to play in the same group with the user.

In particular, the step of selecting the participant(s) to play in the same group with the user from subgroup(s) other than the subgroup of the user in accordance with a specific algorithm includes:

Determine the number of the participant(s) to play in the same group with the user.

When specifically implementing the embodiment of the present invention, the number of the participant(s) to play in the same group with the user is determined, and is stored in a game information repository, thus, the cloud server can obtain the number of participants to play in the same group with the user by searching from the information repository locally stored.

Select the obtained number of waiting queue(s) from the waiting queue(s) other than the waiting queue of the user by employing a specific algorithm which may be a random or pseudo-random algorithm.

In the specific implementation of the embodiment of the present invention, the cloud server can select the obtained number of waiting queue(s) from the waiting queue(s) other than the waiting queue to which the user belongs by employing the random or pseudo-random algorithm commonly used in the prior art which will not be described in detail herein.

Select one waiting user from each of the obtained waiting queue(s) as a participant to play in the same group with the user.

Step 208: the cloud server synchronizes information such as the initial state of the user and the game's participant(s) and so on to the game server.

Step 209: after the game server receives a request of starting the game sent by the user, the game server begins game interactions with the client of the user.

In the embodiment of the present invention, during the game, upon receiving a request of checking the information of the game's participants or a chat request sent by the user, return the information of the game's participants or the chat information to the user, so that the user can check the information of the game's participants or the chat information at any time, so as to improve the users' usage experience.

In addition, in the embodiment of the present invention, when the game ends, an automatic group-switch instruction is sent to the user, and the user is reassigned to another waiting queue that the user corresponds to, so that participant(s) to play in the same group with the user can be reassigned for the user before the game is restarted.

In the embodiment of the present invention, by the implementation of the technical solution of assigning the user to the corresponding waiting queue in accordance with the predetermined condition in the game subzone, and when the user is successfully assigned to the waiting queue that the user corresponds to, selecting the participant(s) to play in the same group with the user in accordance with the specific algorithm from the waiting queue(s) other than the waiting queue to which the user belongs, and allocating game resources for the user and the participant(s) to play in the same group with the user, all users participating in the game can come from different waiting queues, to some extent eliminating the possibility that game participants know each other, thereby the situation of the game participants' cheating can be prevented.

In the embodiment of the present invention, the cloud server randomly assigns game participant(s) for the user, as the function and the operating speed of the cloud server are higher than the client, it can reduce the operation difficulty of the product.

Furthermore, the method for preventing cheating of the cloud server matches seamlessly with the client of the user, and the method for preventing cheating is implemented in the cloud server, so it does not need to upgrade the client when altering the strategy, thereby reducing occurrence of the situation of sacrificing one for the other and increasing the stability of the product.

Embodiment III

Figure 3:
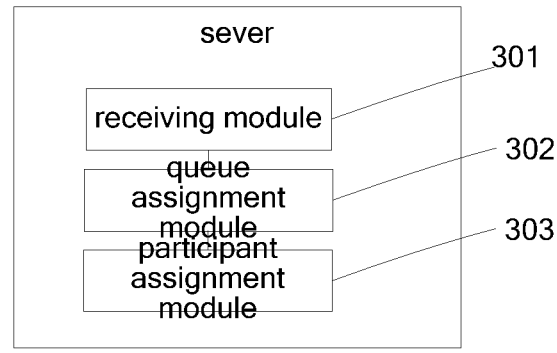
FIG. 3 is a schematic diagram of a structure of a server provided in Embodiment III of the present invention.

Referring to FIG. 3, a server, which specifically may be the same as the cloud server of Embodiment II of the method, includes a receiving module 301, a queue assignment module 302 and a participant assignment module 303.

The receiving module 301 is adapted for receiving a game participation request sent by the user, the game participation request containing game subzone information.

The queue assignment module 302 is adapted for, when the user enters the game subzone identified by the game subzone information, in the game subzone, assigning the user to the waiting queue that the user corresponds to in accordance with a predetermined condition.

The participant assignment module 303 is adapted for, when the user is successfully assigned to the waiting queue that the user corresponds to, selecting the participant(s) to play in the same group with the user from waiting queue(s) other than the waiting queue to which the user belongs, and allocating game resources for the user and the participant(s) to play in the same group with the user.

Figure 4:
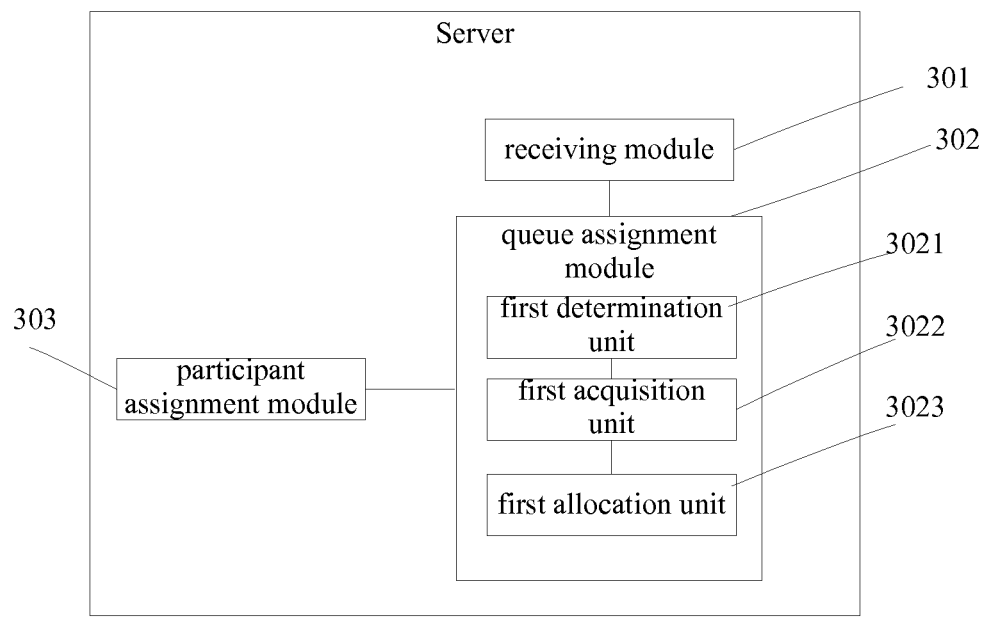
FIG. 4 is a schematic diagram of the structure of a server provided in Embodiment III of the present invention.

Referring to FIG. 4, the queue assignment module 302 shown in FIG. 3 of the embodiment of the present invention may include the following:

The first determination unit 3021 is adapted for, on the condition that the predetermined condition is the time when the user enters the game subzone, determining the time segment to which the user correspondingly belongs according to the time when the user enters the game subzone.

The first acquisition unit 3022 is adapted for obtaining the waiting queue that the time segment to which the user correspondingly belongs corresponds to according to a correspondence between pre-stored time segments and waiting queues.

The first assignment unit 3023 is adapted for judging whether the obtained waiting queue has remaining space, and on the condition that the obtained waiting queue has remaining space, assigning the user to the obtained waiting queue.

Figure 5:
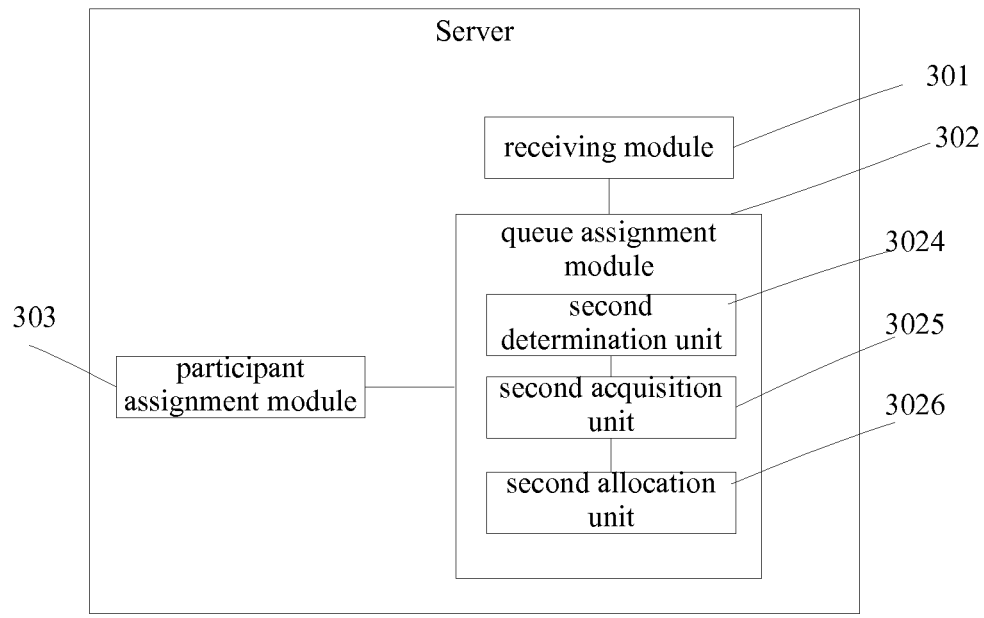
FIG. 5 is a schematic diagram of a structure of a server provided in Embodiment III of the present invention.

Referring FIG. 5, the queue assignment module 302 shown in FIG. 3 of the embodiment of the present invention may alternatively include the following:

The second determination unit 3024 is adapted for, on the condition that the predetermined condition is an Internet Protocol (IP) address being used when the user enters the game subzone, determining the IP address segment to which the user correspondingly belongs according to the IP address being used when the user enters the game subzone.

The second acquisition unit 3025 is adapted for obtaining the waiting queue that the IP address segment to which the user correspondingly belongs corresponds to according to a correspondence between pre-stored IP address segments and waiting queues.

The second assignment unit 3026 is adapted for judging whether the obtained waiting queue has remaining space, and on the condition that the obtained waiting queue has remaining space, assigning the user to the obtained waiting queue.

Figure 6:
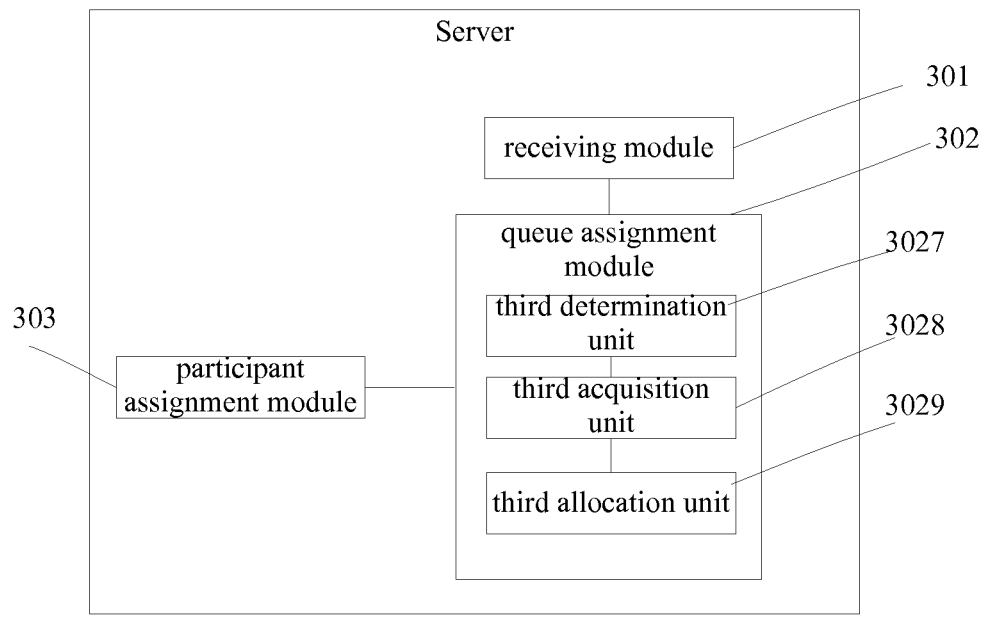
FIG. 6 is a schematic diagram of a structure of a server provided in Embodiment III of the present invention.

Referring to FIG. 6, the queue assignment module 302 shown in FIG. 3 of the embodiment of the present invention may alternatively include the following:

The third determination unit 3027 is adapted for, on the condition that the predetermined condition is an Internet Protocol (IP) address being used when the user enters the game subzone, obtaining a frequency of entering the game subzone that the Internet Protocol (IP) address being used when entering the game subzone corresponds to according to a correspondence between pre-stored IP addresses and frequencies of entering the game subzone.

The third obtaining unit 3028 is adapted for obtaining the waiting queue that the obtained frequency of entering the game subzone corresponds to according to a correspondence between pre-stored frequency segments and waiting queues.

The third assignment unit 3029 is adapted for judging whether the obtained waiting queue has remaining space, and on the condition that the obtained waiting queue has remaining space, assigning the user to the obtained waiting queue.

Figure 7:
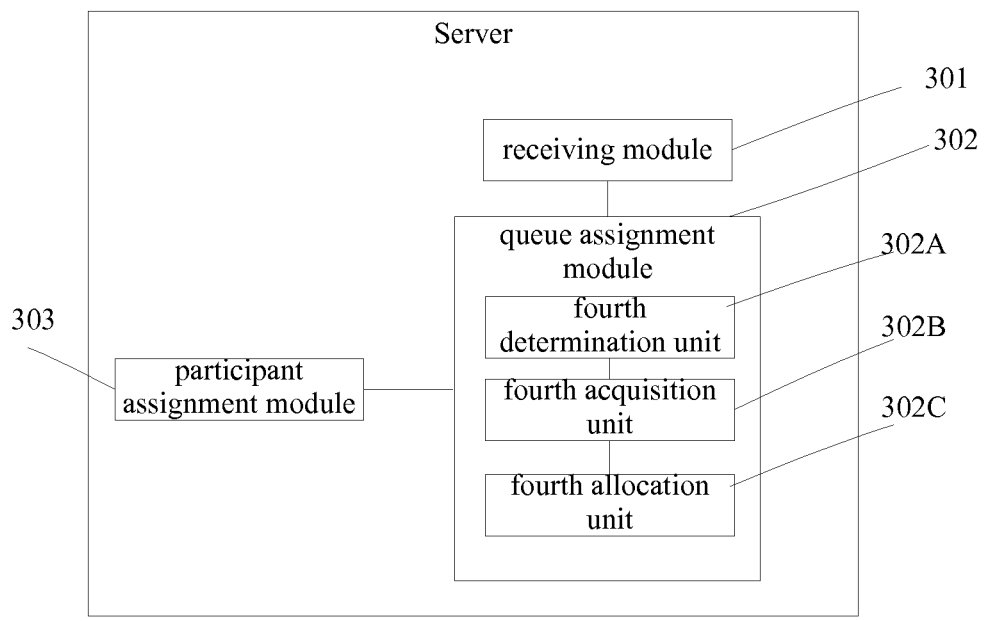
FIG. 7 is a schematic diagram of a structure of a server provided in Embodiment III of the present invention.

Referring to FIG. 7, the queue assignment module 302 shown in FIG. 3 of the embodiment of the present invention may alternatively include the following:

The fourth determination unit 302A is adapted for, on the condition that the predetermined condition is a combination of the time when the user enters the game subzone and an Internet Protocol (IP) address being used when the user enters the game subzone, determining a time segment to which the user correspondingly belongs according to the time when the user enters the game subzone, and determining the IP address segment to which the user correspondingly belongs according to the IP address being used when the user enters the game subzone.

The fourth acquisition unit 302B is adapted for obtaining the waiting queue that the determined time segment and IP address segment corresponds to according to a correspondence between pre-stored time IP segments and waiting queues.

The fourth assignment unit 302C is adapted for judging whether the obtained waiting queue has remaining space, and on the condition that the obtained waiting queue has remaining space, assigning the user to the obtained waiting queue.

Figure 8:
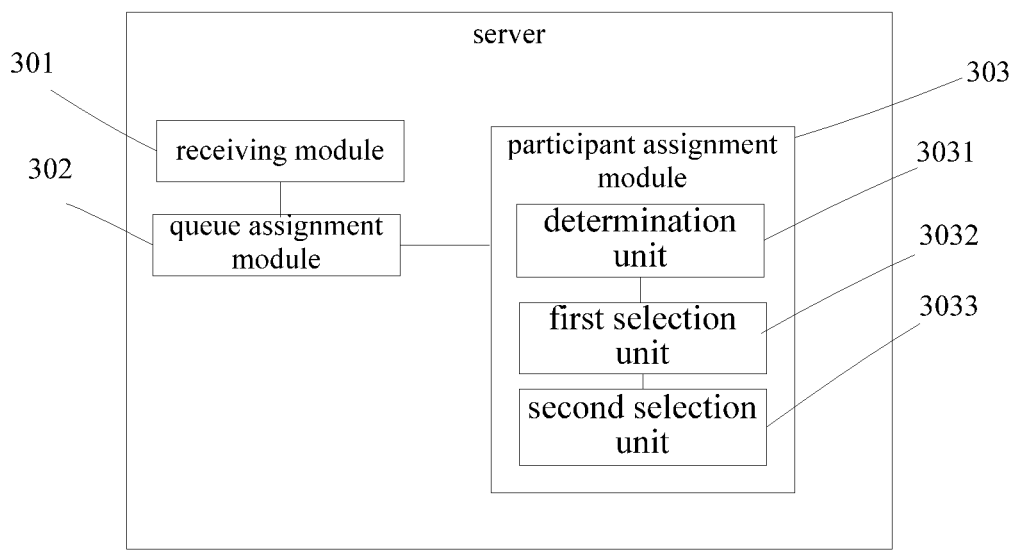
FIG. 8 is a schematic diagram of a structure of a server provided in Embodiment III of the present invention.

Referring to FIG. 8, the participant assignment module 303 shown in FIG. 3 of the embodiment of the present invention may include the following:

A determination unit 3031 is adapted for determining the number of participant(s) to play in the same group with the user.

A first selection unit 3032 is adapted for selecting the obtained number of waiting queue(s) by employing a specific algorithm from waiting queue(s) other than the waiting queue to which the user belongs, where the specific algorithm is a random or pseudo-random algorithm.

A second selection unit 3033 is adapted for respectively selecting one waiting user from each of the obtained waiting queue(s) as a participant to play in the same group with the user.

Figure 9:
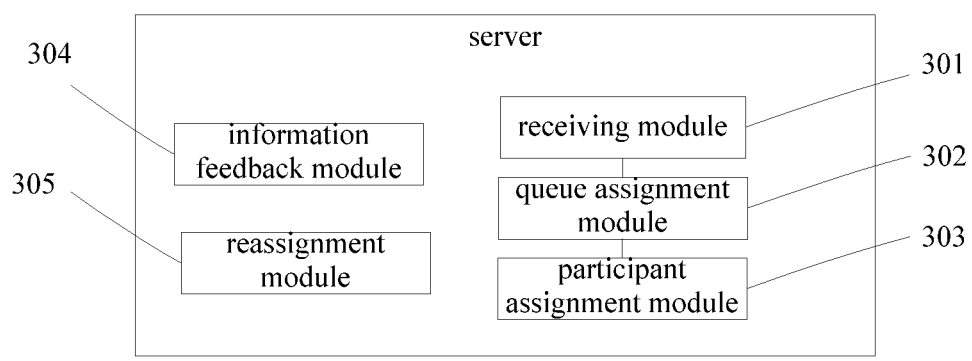
FIG. 9 is a schematic diagram of a structure of a server provided in Embodiment III of the present invention.

Referring to FIG. 9, the server shown in FIG. 3 of the embodiment of the present invention further includes the following:

An information feedback module 304 is adapted for, upon receiving a request for checking information of a game's participant(s) or a chat request during the game, returning the information of the game's participant(s) or the chat information to the user, so that the user can check the information of the game's participant(s) or the chat information at any time; or/and, A reassignment module 305 is adapted for sending an automatic group-switch instruction to the user, and reassigning the user to another waiting queue that the user corresponds to when the game ends, in order to reassign participant(s) to play in the same group with the user for the user before the game is restarted.

In the embodiment of the present invention, by the implementation of the technical solution of assigning the user to the corresponding waiting queue in accordance with the predetermined condition in the game subzone, and when the user is successfully assigned to the waiting queue that the user corresponds to, selecting the participant(s) to play in the same group with the user in accordance with the specific algorithm from the waiting queue(s) other than the waiting queue to which the user belongs, and allocating game resources for the user and the participant(s) to play in the same group with the user, all users participating in the game can come from different waiting queues, to some extent eliminating the possibility that game participants know each other, thereby the situation of the game participants' cheating can be prevented.

In the embodiment of the present invention, the cloud server randomly assigns game participant(s) for the user, as the function and the operating speed of the cloud server are higher than the client, it can reduce the operation difficulty of the product.

Furthermore, the method for preventing cheating of the cloud server matches seamlessly with the client of the user, and the method for preventing cheating is implemented in the cloud server, so it does not need to upgrade the client when altering the strategy, thereby reducing occurrence of the situation of sacrificing one for the other and increasing the stability of the product.

The embodiment of the present invention provides a machine-readable medium, having a set of instructions stored thereon, and when the set of instructions is executed, a machine is enabled to perform a method for allocating game resources, the method including:

receiving a game participation request sent by a user, the game participation request including game subzone information;

when the user enters a game subzone identified by the game subzone information, assigning the user to a waiting queue that the user corresponds to in the game subzone in accordance with a predetermined condition; and when the user is successfully assigned to the waiting queue that the user corresponds to, selecting participant(s) to play in the same group with the user from waiting queue(s) other than the waiting queue of the user, and allocating game resources for the user and the participant(s) to play in the same group with the user.

Based on the above description of the embodiments, those skilled in the art can clearly understand that the present invention can be accomplished through a software plus hardware platform, and of course it can be accomplished via hardware, but, in many cases, the former is preferred. The subject-matter of the technical solution of the present invention or the part that makes a contribution to the prior art can be represented in a form of a software product, and the computer software product is stored in a storage medium, such as a floppy disk, a hard disk, an optical disk or the like in a computer, including several instructions of the above-mentioned method which is to cause a computing device (which may be a personal computer, a server, a network device or etc.,) to execute the method according to various embodiments of the present invention, or to configure a universal hardware device as the device of the present invention, so as to implement the schemes mentioned in various embodiments of the present invention. The universal hardware device includes a memory, such as ROM/RAM etc., for storing instructions, and a processor, such as CPU, coupled with the memory and configured to execute the instructions stored in the memory.

The above described are only the preferred embodiments of the present invention, and are not intended to limit the present invention, and any modifications, equivalent replacements and improvements within the spirit and principle of the present invention should be included within the protection scope of the present invention.

What is claimed is:

1. A method for allocating game resources, comprising:
    receiving a game participation request sent by a user, the game participation request comprising game subzone information;
    in response to determining that the user enters a game subzone identified by the game subzone information, assigning the user to a waiting queue, to which the user corresponds and in which the user waits for playing a game in the game subzone, in accordance with a predetermined condition, wherein the predetermined condition is a time when the user enters the game subzone, comprising:
    determining a time segment, to which the user belongs, according to the time when the user enters the game subzone;
    obtaining the waiting queue, to which the determined time segment corresponds, according to a pre-stored mapping relationship between time segments and waiting queues; and
    judging whether the obtained waiting queue has remaining space, and assigning the user to the obtained waiting queue on the condition that the obtained waiting queue has remaining space; and
    in response to determining that the user is successfully assigned to the waiting queue, selecting one or more participants from a plurality of users, from one or more waiting queues other than the waiting queue of the user, to play the game in the same group with the user, and allocating game resources for the user and the selected one or more participants, wherein all the user and the one or more participants are from different waiting queues.

2. The method according to claim 1, wherein, the predetermined condition is an Internet Protocol (IP) address used by the user when the user enters the game subzone; and
    a process of assigning the user to the waiting queue, to which the user corresponds, and in which the user waits for playing the game in the game subzone, in accordance with the predetermined condition comprises:
    determining an IP address segment, to which the user belongs, according to the IP address used by the user when the user enters the game subzone;
    obtaining the waiting queue, to which the determined IP address segment corresponds, according to a pre-stored mapping relationship between IP address segments and waiting queues; and
    judging whether the obtained waiting queue has remaining space, and assigning the user to the obtained waiting queue on the condition that the obtained waiting queue has remaining space.

3. The method according to claim 1, wherein, the predetermined condition is an Internet Protocol (IP) address used by the user when the user enters the game subzone; and
    a process of assigning the user to the waiting queue, to which the user corresponds and in which the user waits for playing the game in the game subzone, in accordance with the predetermined condition comprises:
    obtaining a frequency of entering the game subzone, to which the IP address used by the user when the user enters the game subzone corresponds, according to a pre-stored mapping relationship between IP addresses and frequencies of entering the game subzone;
    obtaining the waiting queue, to which the obtained frequency of entering the game subzone corresponds, according to a pre-stored mapping relationship between frequency segments and waiting queues; and
    judging whether the obtained waiting queue has remaining space, and assigning the user to the obtained waiting queue on the condition that the obtained waiting queue has remaining space.

4. The method according to claim 1, wherein, the predetermined condition is a combination of the time when the user enters the game subzone and an Internet Protocol (IP) address used by the user when the user enters the game subzone; and
    a process of assigning the user to the waiting queue, to which the user corresponds and in which the user waits for playing the game in the game subzone, in accordance with the predetermined condition comprises:
    determining a time segment, to which the user belongs, according to the time when the user enters the game subzone, and determining an IP address segment, to which the user belongs, according to the IP address used by the user when the user enters the game subzone;

obtaining the waiting queue, to which the determined time segment and IP address segment correspond, according to a pre-stored mapping relationship between time IP segments and waiting queues; and judging whether the obtained waiting queue has remaining space, and assigning the user to the obtained waiting queue on the condition that the obtained waiting queue has remaining space.

5. The method according to claim 1, wherein, a process of selecting one or more participants from the plurality of users, from the one or more waiting queues other than the waiting queue of the user, to play the game in the same group with the user comprises:

determining a number of the one or more participants to play the game in the same group with the user;

selecting the obtained number of the one or more waiting queues from the one or more waiting queues other than the waiting queue of the user; and respectively selecting one waiting user from each of the obtained one or more waiting queues as a participant to play the game in the same group with the user.

6. The method according to claim 1, wherein, after the process of selecting one or more participants from the plurality of users, from the one or more waiting queues other than the waiting queue of the user, to play the game in the same group with the user, the method further comprises:

during the game, upon receiving a request of checking information of the game's one or more participants or a chat request sent by the user, returning the information of the game's one or more participants or chat information to the user; or in response to determining that a game ends, sending an automatic group-switch instruction to the user, and reassigning the user to another waiting queue, to which the user corresponds, so as to reassign one or more participants to play the game in the same group with the user before the game is restarted.

7. A server, comprising:

a processor;

a memory which stores computer readable instructions that when executed by the processor cause the processor to:

receive a game participation request sent by a user, the game participation request comprising game subzone information;

in response to determining that the user enters a game subzone identified by the game subzone information, assign the user to a waiting queue, to which the user corresponds and in which the user waits for playing a game, in the game subzone, in accordance with a predetermined condition, wherein the predetermined condition is a time when the user enters the game subzone, comprising:

determining a time segment, to which the user belongs, according to the time when the user enters the game subzone;

obtaining the waiting queue, to which the determined time segment corresponds, according to a pre-stored mapping relationship between time segments and waiting queues; and judging whether the obtained waiting queue has remaining space, and assigning the user to the obtained waiting queue on the condition that the obtained waiting queue has remaining space; and in response to determining that the user is successfully assigned to the waiting queue, select one or more participants from a plurality of users, from one or more waiting queues other than the waiting queue of the user, to play the game in the same group with the user, and to allocate game resources for the user and the selected one or more participants, wherein all the user and the one or more participants are from different waiting queues.

8. The server according to claim 7, wherein, wherein, the predetermined condition is an Internet Protocol (IP) address used by the user when the user enters the game subzone; and a process of assigning the user to the waiting queue, to which the user corresponds, and in which the user waits for playing the game in the game subzone, in accordance with the predetermined condition comprises:

determining an IP address segment, to which the user belongs, according to the IP address used by the user when the user enters the game subzone;

obtaining the waiting queue, to which the determined IP address segment corresponds, according to a pre-stored mapping relationship between IP address segments and waiting queues; and judging whether the obtained waiting queue has remaining space, and assigning the user to the obtained waiting queue on the condition that the obtained waiting queue has remaining space.

9. The server according to claim 7, wherein, the predetermined condition is an Internet Protocol (IP) address used by the user when the user enters the game subzone; and a process of assigning the user to the waiting queue, to which the user corresponds and in which the user waits for playing the game in the game subzone, in accordance with the predetermined condition comprises:

obtaining a frequency of entering the game subzone, to which the IP address used by the user when the user enters the game subzone corresponds, according to a pre-stored mapping relationship between IP addresses and frequencies of entering the game subzone;

obtaining the waiting queue, to which the obtained frequency of entering the game subzone corresponds, according to a pre-stored mapping relationship between frequency segments and waiting queues; and judging whether the obtained waiting queue has remaining space, and assigning the user to the obtained waiting queue on the condition that the obtained waiting queue has remaining space.

10. The server according to claim 7, wherein, the predetermined condition is a combination of the time when the user enters the game subzone and an Internet Protocol (IP) address used by the user when the user enters the game subzone; and a process of assigning the user to the waiting queue, to which the user corresponds and in which the user waits for playing the game in the game subzone, in accordance with the predetermined condition comprises:

determining a time segment, to which the user belongs, according to the time when the user enters the game subzone, and determining an IP address segment, to which the user belongs, according to the IP address used by the user when the user enters the game subzone;

obtaining the waiting queue, to which the determined time segment and IP address segment correspond, according to a pre-stored mapping relationship between time IP segments and waiting queues; and judging whether the obtained waiting queue has remaining space, and assigning the user to the obtained waiting queue on the condition that the obtained waiting queue has remaining space.

11. The server according to claim 7, wherein, a process of selecting one or more participants from the plurality of users, from the one or more waiting queues other than the waiting queue of the user, to play the game in the same group with the user comprises:
   determining a number of the one or more participants to play the game in the same group with the user;
   selecting the obtained number of the one or more waiting queues from the one or more waiting queues other than the waiting queue of the user by adopting an algorithm; and
   respectively selecting one waiting user from each of the obtained one or more waiting queues as a participant to play the game in the same group with the user.

12. The server according to claim 7, wherein, the memory further stores computer readable instructions that when executed by the processor cause the processor to:
   during the game, upon receiving a request of checking information of the game's one or more participants or a chat request sent by the user, return the information of the game's participants or the chat information to the user; or
   in response to determining that a game ends, sending an automatic group-switch instruction to the user, and reassign the user to another waiting queue, to which the user corresponds and in which the user waits for playing the game, so as to reassign one or more participants to play the game in the same group with the user before the game is restarted.

13. A non-transitory machine-readable medium, having a set of instructions stored thereon, wherein when the set of instructions is executed, a machine is enabled to perform a method for allocating game resources, and the method comprises:
   receiving a game participation request sent by a user, the game participation request comprising game subzone information;
   in response to determining that the user enters a game subzone identified by the game subzone information, assigning the user to a waiting queue, to which the user corresponds and in which the user waits for playing a game in the game subzone, in accordance with a predetermined condition, wherein the predetermined condition is a time when the user enters the game subzone, comprising:
   determining a time segment, to which the user belongs, according to the time when the user enters the game subzone;
   obtaining the waiting queue, to which the determined time segment corresponds, according to a pre-stored mapping relationship between time segments and waiting queues; and
   judging whether the obtained waiting queue has remaining space, and assigning the user to the obtained waiting queue on the condition that the obtained waiting queue has remaining space; and
   in response to determining that the user is successfully assigned to the waiting queue, selecting one or more participants from a plurality of users, from one or more waiting queues other than the waiting queue of the user, to play the game in the same group with the user, and allocating game resources for the user and the selected one or more participants, wherein all the user and the one or more participants are from different waiting queues.

14. The method according to claim 1, wherein selecting one or more participants from the plurality of users, from the one or more waiting queues other than the waiting queue of the user, to play the game in the same group with the user, comprising:
   employing an algorithm to obtain a number of the one or more waiting queues other than the waiting queue of the user; and
   selecting one waiting user from each of the one or more waiting queues other than the waiting queue of the user as a participant of the one or more participants to play in the same group with the user.

15. The server according to claim 7, wherein select one or more participants from a plurality of users, from one or more waiting queues other than the waiting queue of the user, to play the game in the same group with the user, comprising:
   employ an algorithm to obtain a number of the one or more waiting queues other than the waiting queue of the user; and
   select one waiting user from each of the one or more waiting queues other than the waiting queue of the user as a participant of the one or more participants to play in the same group with the user.

16. The non-transitory machine-readable medium according to claim 13, wherein selecting one or more participants from the plurality of users, from the one or more waiting queues other than the waiting queue of the user, to play the game in the same group with the user, comprising:
   employing an algorithm to obtain a number of the one or more waiting queues other than the waiting queue of the user; and
   selecting one waiting user from each of the one or more waiting queues other than the waiting queue of the user as a participant of the one or more participants to play in the same group with the user.

* * * * *